United States Patent [19]

Ikeno et al.

[11] Patent Number: 5,204,437

[45] Date of Patent: Apr. 20, 1993

[54] ORGANOPOLYSILOXANE COMPOSITION AND ITS GEL CURED PRODUCT

[75] Inventors: Masayuki Ikeno, Annaka; Hironao Fujiki, Takasaki, both of Japan

[73] Assignee: Shin-Etsu Chemical Co., Ltd., Tokyo, Japan

[21] Appl. No.: 738,442

[22] Filed: Jul. 31, 1991

[30] Foreign Application Priority Data

Aug. 1, 1990 [JP] Japan ................... 2-204075

[51] Int. Cl.$^5$ ............................................. C08G 77/06
[52] U.S. Cl. ................................... 528/15; 525/478; 528/31; 528/32
[58] Field of Search ................. 528/15, 31, 32; 525/478

[56] References Cited

U.S. PATENT DOCUMENTS

| | | | |
|---|---|---|---|
| 4,077,943 | 3/1978 | Sato et al. ............................ | 528/15 |
| 4,245,079 | 1/1981 | Matsumoto et al. . | |
| 4,477,641 | 10/1984 | Matsumoto . | |
| 4,721,764 | 1/1988 | Fujiki et al. ........................ | 528/15 |
| 5,051,467 | 9/1991 | Okinoshima et al. ................ | 528/15 |

OTHER PUBLICATIONS

Chemical Abstracts, vol. 89, No. 14, Oct. 2, 1978; Columbus, Ohio, U.S.; abstract No. 111954w, Y. Matsumoto et al., "Silicone Rubber Compositions", p. 123; & JP-A-53 033 256.

Patent Abstracts of Japan, vol. 12, No. 248 (C-511) (3095), Jul. 13, 1988; & JP-A-63-035 655, Feb. 16, 1988, N. Nakamura, et al., "Silicon Gel Composition".

*Primary Examiner*—Melvyn I. Marquis
*Attorney, Agent, or Firm*—Oblon, Spivak, McClelland, Maier & Neustadt

[57] ABSTRACT

An organopolysiloxane composition, comprising (A) an organopolysiloxane having alkenyl groups bonded to silicon atoms, (B) an organohydrogenpolysiloxane having two or more hydrogen atoms bonded to silicon atoms, and (C) an addition reaction catalyst, wherein the vinyl group containing organopolysiloxane (A) as a base polymer and the organohydrogenpolysiloxane (B) as a crosslinking agent each have at least two alkoxy group and/or at least one epoxy group in the molecule. By subjecting this composition to addition curing, a gel cured product excellent in adhesion particularly to metals is obtained.

7 Claims, 1 Drawing Sheet

ORGANOPOLYSILOXANE COMPOSITION AND ITS GEL CURED PRODUCT

BACKGROUND OF THE INVENTION

1. Field of the Invention

The present invention relates to an addition curing type organopolysiloxane and its gel cured product excellent in adhesion to various substrates.

2. Description of the Prior Art

Because of their excellent electrical insulating properties, their excellent stability of the electrical properties, and their excellent flexibility, gel cured products of silicone rubbers are used for potting or sealing electrical and electronic parts, and particularly are used as a covering material for covering controlling circuit elements such as power transistors, IC, and condensers to protect them from being thermally or mechanically disordered.

As addition curing type organopolysiloxane compositions capable of forming silicone gels, various types are conventionally known.

For example, compositions that comprise an organopolysiloxane having vinyl groups bonded to silicon atoms and an organohydrogenpolysiloxane having hydrogen atoms bonded to silicon atoms and will be subjected to a crosslinking reaction in the presence of a platinum catalyst to provide a silicone gel are known (see Japanese Preexamination Patent Publication (Kokai) Nos. 143241/1981, 39659/1987, 35655/1988, and 33475/1988).

However, the above compositions that can be cured into gels and the gel cured products obtained therefrom are low in adhesion and therefore they have a defect that they are poor in adhesion to substrates. That is, where they are used in potting electrical and electronic parts, separation between the part and the gel cured product can occur, which causes a problem that moisture, water or the like penetrates therefrom and, for example, corrosion or defective insulation takes place.

On the other hand, Japanese Patent Publication (Kokoku) Nos. 13508/1978 and 21026/1978 teach that an adhesive elastomer is obtained by reacting an organopolysiloxane whose both ends are blocked with vinyl groups and an organohydrogenpolysiloxane having alkoxy groups and epoxy groups in the presence of a platinum compound. Further, Japanese Patent Publication (Kokoku) No. 43870/1985 teaches that an adhesive elastomer is obtained by using a vinyl group containing organopolysiloxane with trialkoxysilyl groups.

However, these are highly elastic elastomers and are completely different from gel cured products and if they are used as a protective material or an insulating material, for example, for semiconductor circuit elements, a thermal stress occurs in the elastomer itself due, for example, to the self-heat generation of the circuit element itself or the temperature environment where it is used, leading inevitably to a disadvantage that the semiconductor device or the like is broken.

SUMMARY OF THE INVENTION

Therefore, an object of the present invention is to provide an addition curing type organopolysiloxane composition and its cured product that exhibit excellent adhesion to substrates such as metals.

The present invention has succeeded in attaining the above object by introducing a siloxane unit having alkoxy groups or an epoxy group into at least one of a base polymer and a crosslinking agent.

According to the present invention, there is provided an organopolysiloxane composition, comprising (A) an organopolysiloxane having 0.1 to 2 alkenyl groups bonded to silicon atoms on average in the molecule, (B) an organohydrogenpolysiloxane having two or more hydrogen atoms bonded to silicon atoms in the molecule, and (C) an addition reaction catalyst, wherein at least one of said organopolysiloxane (A) and said organohydrogenpolysiloxane (B) has at least two alkoxy groups and/or at least one epoxy group in the molecule, and said organohydrogenpolysiloxane (B) is blended in such an amount that the number of the hydrogen atoms bonded to silicon atoms of the organohydrogenpolysiloxane (B) is 0.5 to 2 per alkenyl group bonded to a silicon atom of the organopolysiloxane (A).

Also according to the present invention, a gel cured product obtained by curing the above composition is provided.

According to the present organopolysiloxane composition, a gel cured product excellent in adhesion to substrates such as metals, ceramics, and glasses is obtained. Therefore, by forming this gel cured product on the surface, for example, of various electrical parts, electronic parts, and semiconductor devices, its covering or sealing can be carried out effectively.

DETAILED DESCRIPTION OF THE INVENTION

(A) Organopolysiloxanes

Figure 1:
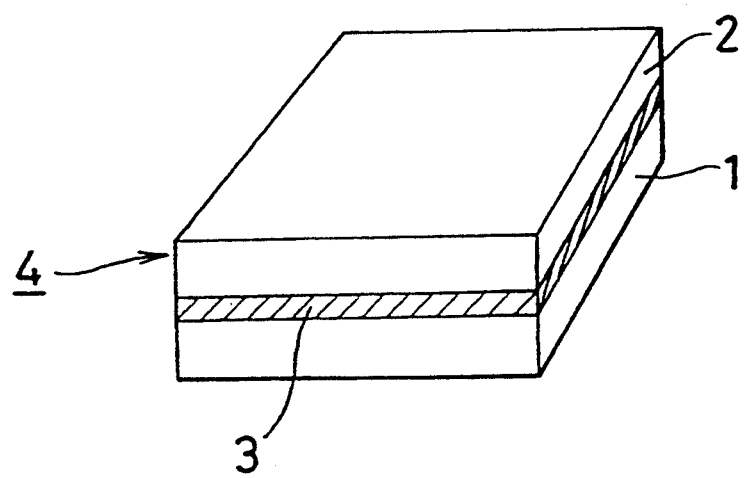
FIG. 1 is a view showing a test specimen used in the adhesion test performed in an example.

The organopolysiloxane that is the component (A) used in the present invention has alkenyl groups bonded to silicon atoms in the molecule and may be a linear or branched organopolysiloxane or a resinous organopolysiloxane or a mixture of these.

The alkenyl group preferably has 2 to 8 carbon atoms and specific examples thereof include a vinyl group, an ally group, a 1-butenyl group, and a 1-hexenyl group. It is required that the number of these alkenyl groups to be contained in the organopolysiloxane molecule is 0.1 to 2, preferably 0.5 to 1.8, on average. If the number of the alkenyl group is less than 0.1, the adhesion to substrates lowers considerably since the number of organopolysiloxane molecules which do not take part in the crosslinking reaction becomes large. On the other hand, if the number of the alkenyl groups is more than 2, the produced gel cured product becomes too hard to function as a gel, leading to a disadvantage such as generation of a thermal stress in the cured product itself.

Further, in the present invention, it is required that at least two alkoxy groups and/or at least 1 epoxy group are contained in the molecule of at least one of the organopolysiloxane (A) and the below-mentioned organohydrogenpolysiloxane (B). Indeed, both such alkoxy groups and an epoxy group may be contained in the molecule. Examples of the alkoxy group include alkoxy groups having up to 4 carbon atoms such as a methoxy group, an ethoxy group, a propioxy group, and a butoxy group. The epoxy group includes, for example, an epoxy group represented by the following formula:

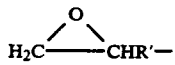

wherein R' represents a bivalent organic group, for example, an alkylene group such as a methylene group, an ethylene group, and a propylene group; an aromatic group such as a phenylene group; a halogenated alkylene group such as a chloroethylene group and a fluoroethylene group; an OH-group containing hydrocarbon group; or an ether linkage group containing hydrocarbon group; or an ether linkage containing hydrocarbon group such as —CH2OCH2CH2CH2—,

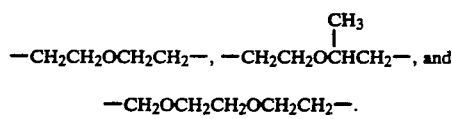

Other examples of the epoxy group include a β-(3,4-epoxycyclohexyl)ethyl group and a γ-(3,4-epoxycyclohexyl)propyl group.

The above-mentioned organopolysiloxane (A) used in the present invention is represented, for example, by the following average composition formula [I]:

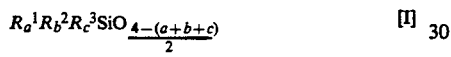

wherein a is a number with $0<a<3$, b is a number with $0\leq b<3$, and c is a number with $0\leq c<3$, provided that $0<a+b+c<4$, $R^1$ represents an alkenyl group, $R^2$ represents a substituted or unsubstituted hydrocarbon group containing no aliphatic unsaturated groups, and $R^3$ represents an alkoxy group or an epoxy group. In this average composition formula [I], suitable examples of the group $R^2$ include unsubstituted or substituted monovalent hydrocarbon groups having 1 to 20, particularly 1 to 10, carbon atoms, for example, an alkyl group such as a methyl group, an ethyl group, a propyl group, an isopropyl group, a butyl group, a pentyl group, a hexyl group, an octyl group, a decyl group, and a dodecyl group; a cycloalkyl group such as a cyclopentyl group, a cyclohexyl group, and a cyclobutyl group; an aryl group such as a phenyl group, a tolyl group, a xylyl group, and a naphthyl group; an aralkyl group such as a benzyl group, a phenylethyl group, and a phenylpropyl group; and a group formed by replacing part or all of the hydrogen atoms of these hydrocarbon groups, for example, with halogen atoms such as chlorine, fluorine, and bromine atoms or with cyano groups such as a halogenated hydrocarbon group including a chloromethyl group, a trifluoropropyl group, a chlorophenyl group, a dibromophenyl group, a tetrachlorophenyl group, and a difluorophenyl group, and a cyano alkyl group including a β-cyanoethyl group, a γ-cyanopropyl group, and a β-cyanopropyl group. Two of the groups $R^2$ may bond together to form a lower alkylene group having 6 or less carbon atoms and such a lower alkylene group includes, for example, an ethylene group, a trimethylene group, a methylmethylene group, a tetramethylene group, and a hexamethylene group.

Preferable examples of the organopolysiloxane (A) are given below:

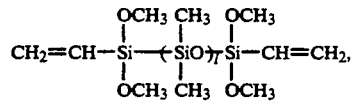

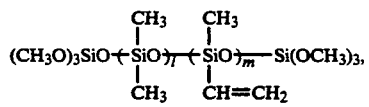

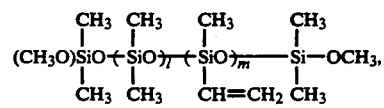

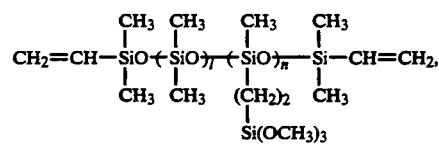

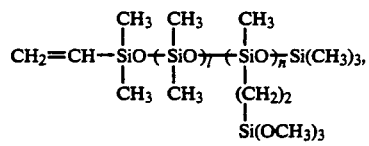

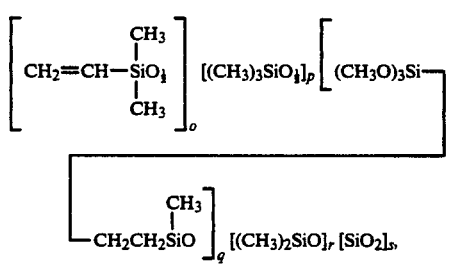

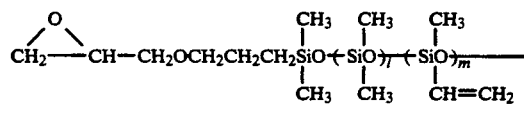

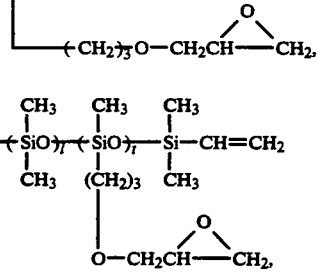

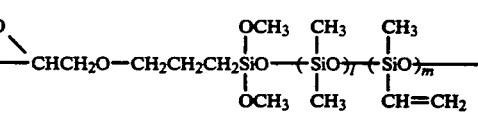

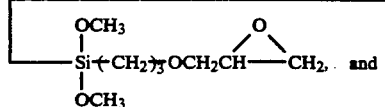

-continued

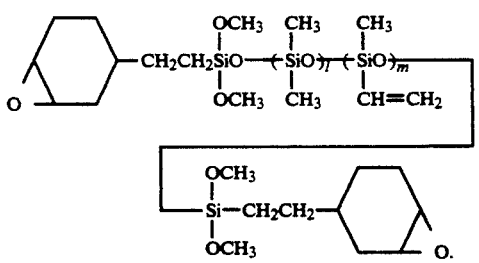

wherein, in the above formulas, 1 to t are each a positive integer.

These organopolysiloxanes (A) may be used singly or as a mixture of two or more so long as there are 0.1 to 2 alkenyl groups in the molecule on average.

The viscosity of the above organopolysiloxane (A) at 25° C. is preferably in the range of 100 to 100,000 cP, particularly 300 to 5,000 cP. If the viscosity is lower than 100 cP, it is readily flowable and the physical properties of the cured product are apt to become unsatisfactory, while if the viscosity is over 100,1000 cP, the workability and the release of bubbles become poor.

(B) Organohydrogenpolysiloxanes

The organohydrogenpolysiloxane (B) used in the present invention has two or more hydrogen atoms bonded to silicon atoms in its molecule and can form a gel cured product by the addition reaction of said hydrogen atoms with the alkenyl groups in the above organopolysiloxane (A).

As described above, in the present invention, it is required that at least one, preferably each, of the organopolysiloxane (A) and the organohydrogenpolysiloxane (B) has at least two alkoxy groups and/or at least one epoxy group in the molecule. Owing to the presence of the alkoxy groups and/or the epoxy group, it becomes possible to form a gel cured product exhibiting excellent adhesion to substrates such as metals. Specific examples of the alkoxy group and the epoxy group are the same as those explained under the above organopolysiloxane (A).

The organohydrogenpolysiloxane (B) is represented, for example, by the following average composition formula [II]:

$$R_d^4 H_e R_f^5 SiO_{\frac{4-(d+e+f)}{2}} \quad [II]$$

wherein d is a number with $0 \leq d < 3$, e is a number with $0 < e < 2$, and f is a number with $0 \leq f < 3$, provided that $0 < d + e + f < 4$, $R^4$ represents a substituted or unsubstituted monovalent hydrocarbon group containing no aliphatic unsaturated groups, and $R^5$ represents an alkoxy group or an epoxy group. In the above average composition formula [II], specific examples of the hydrocarbon group $R^4$ include those groups exemplified for the hydrocarbon group $R^2$ in the above average composition formula [I] and similarly to $R^2$, two $R^4$ may bond together to form a lower alkylene group.

Preferable specific examples of the organohydrogenpolysiloxane (B) include the following:

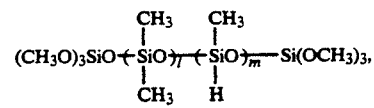

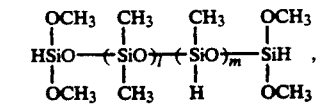

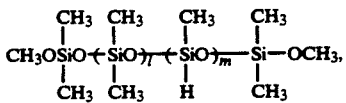

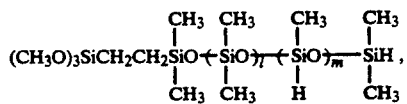

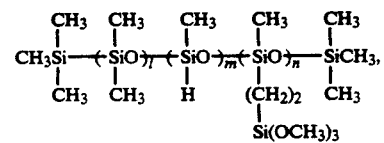

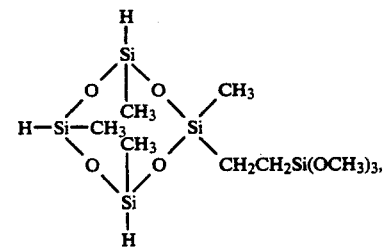

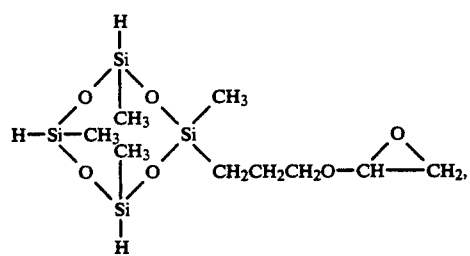

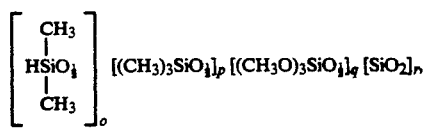

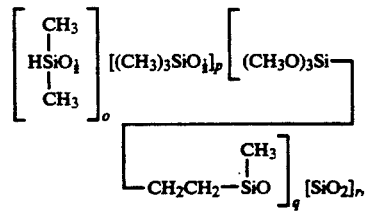

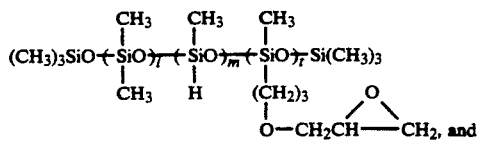

-continued

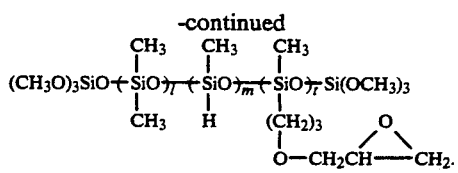

wherein, in the above formulas, 1 to t are each a positive integer.

The viscosity of the organohydrogenpolysiloxane (B) at 25° C. is preferably in the range of 2 to 1,000 cP in view of the easiness of the synthesis and the workability.

In the present invention, the amount of the organohydrogenpolysiloxane (B) to be blended is such that the hydrogen atoms bonded to silicon atoms in the component (B) are 0.5 to 3, preferably 0.8 to 2, in number, per alkenyl group of the component (A). If the number of the hydrogen atoms bonded to silicon atoms is less than the above range, the heat resistance drops because the alkenyl groups remain in the gel cured product, while if the number of the hydrogen atoms bonded to silicon atoms is over than the above range, the heat resistance also drops and there is a risk that foaming occurs when the composition is cured.

(C) Addition Reaction Catalysts

The addition reaction catalyst used in the present invention may be any catalyst that can promote the addition reaction between the alkenyl group of the component (A) and the hydrosilyl group (Si—H group) of the component (B) and, for example, chloroplatinic acid, an alcohol-modified chloroplatinic acid, the coodination compound of chloroplatinic acid with an olefin or vinylsiloxane or an acetylene compound, tetrakis(triphenylphosphine)palladium, or chlorotris(triphenylphosphine)rhodium can be used. A platinum catalyst is particularly preferred.

The catalyst is generally blended in an amount of 0.1 to 1,000 ppm based on the sum of the components (A) and (B).

Other Ingredients

In the present organopolysiloxane composition, other than the above components (A) to (C), various ingredients known per se can be added.

For example, an inorganic filler such as fumed silica, silica aerosil, precipitated silica, ground silica, diatomaceous earth, iron oxide, zinc oxide, titanium oxide, calcium carbonate, magnesium carbonate, zinc carbonate, and carbon black may be added, so that the hardness, mechanical strength, etc. of the gel cured product obtained from the present composition can be adjusted. Of course, for example, a hollow inorganic filler, a hollow organic filler, an organosilicone resin, or a rubbery spherical filler may be added. Also, a reaction retarding agent such as a polymethylvinylsiloxane cyclic compound, an acetylene compound, and an organophosphorus compound may be added to control the curing reaction. These ingredients are used in arbitrary amounts so long as they do not injure the properties of the obtained gel cured product.

Formation of the Gel Cured Product

When the present organopolysiloxane compound comprising the above components is cured, a gel cured product excellent in adhesion to substrates can be formed.

In this specification, the term "a gel cured product" means a silicone cured product which has a penetration of 200 or below when measured according to ASTM D-1403 (¼ Scale Cone). The gel cured product generally has partially a three-dimensional network and can be deformed or fluidized under the influence of stress.

The formation of a gel cured product is carried out in a conventionally known manner, for example, by pouring the present addition curing type organopolysiloxane composition into a suitable mold and curing the composition, or by coating a suitable substrate with the composition and curing the composition. The curing can easily be carried out generally by heat treatment at a temperature of 60° to 150° C. for about 30 to 180 min.

EXAMPLES

The present invention will now be described with reference to the following Examples. In the Examples, Me and Vi stand for a methyl group and a vinyl group respectively and the viscosity was measured at 25° C.

Examples 1 to 4 and Comparative Example 1

Materials as shown below were blended as shown in Table 1 to produce compositions of Examples 1 to 4 and Comparative Example 1.

Polysiloxane I: a dimethylpolysiloxane whose both ends are blocked with vinyl groups (viscosity: 1,000 cP) and which is represented by the following average formula:

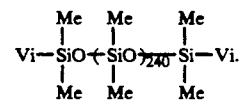

Polysiloxane II: a vinyl group containing dimethylpolysiloxane (viscosity: 800 cP) represented by the following average formula:

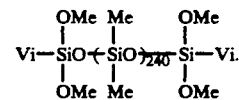

Polysiloxane III: a vinyl group containing dimethylpolysiloxane (viscosity: 800 cP) represented by the following average formula:

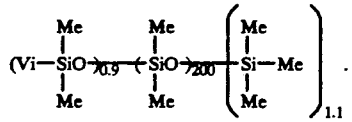

Polysiloxane IV: a vinyl group containing dimethylpolysiloxane (viscosity: 800 cP) represented by the following average formula:

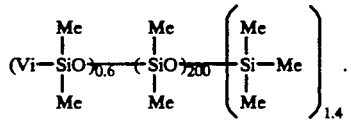

Polysiloxane V: an alkoxy group containing methylhydrogenpolysiloxane (viscosity: 15 cP) represented by the following average formula:

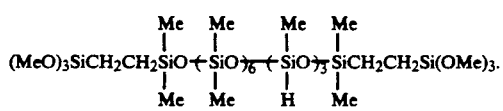

Polysiloxane VI: an alkoxy group containing methylhydrogenpolysiloxane (viscosity: 5 cP) represented by the following formula:

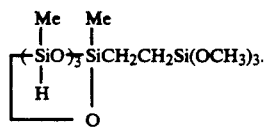

Polysiloxane VII: an epoxy group containing methylhydrogenpolysiloxane (viscosity: 5 cP) represented by the following formula:

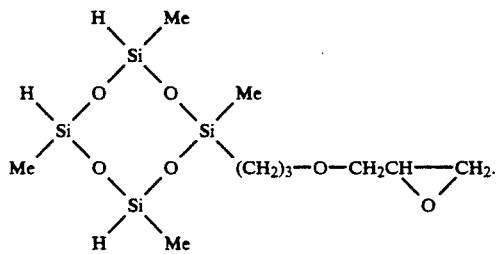

Polysiloxane VIII: a methylhydrogenpolysiloxane (viscosity: 20 cP) represented by the following average formula:

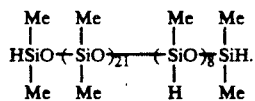

Platinum catalyst: a vinyl siloxane complex of chloroplatinic acid containing 1 wt. % of platinum.

TABLE 1

| | Example 1 | Example 2 | Example 3 | Example 4 | Example 5 | Comparative Example 1 |
|---|---|---|---|---|---|---|
| Polysiloxane I | 100 | | | | | |
| Polysiloxane II | | 100 | | | | |
| Polysiloxane III | | | 100 | 100 | 100 | |
| Polysiloxane IV | | | | | | 100 |
| Polysiloxane V | 2.4 | 2.4 | 2 | | | |
| Polysiloxane VI | | | | 0.8 | | |
| Polysiloxane VII | | | | | 0.7 | |
| Polysiloxane VIII | | | | | | 1.0 |
| Platinum catalyst | 0.05 | 0.05 | 0.05 | 0.05 | 0.05 | 0.05 |
| SiH/SiVi (molar ratio) | 0.6 | 0.6 | 1.0 | 1.0 | 1.0 | 1.2 |

TABLE 1-continued

| | Example 1 | Example 2 | Example 3 | Example 4 | Example 5 | Comparative Example 1 |
|---|---|---|---|---|---|---|

In the table, all the values are given in parts by weight except the ratios of SiH/SiVi.

Each of the above compositions was heated at 120° C. for one hour. As a result, all of them were cured to form transparent gels. The gels were subjected to the penetration test in accordance with ASTM D-1403 (¼ Scale Cone) and values as shown in Table 2 were obtained.

For each of the compositions of Examples 1 to 5 and Comparative Example 1, a test specimen was prepared as follows. As shown in FIG. 1, space was provided between two acrylic resin plates 1 and 2 measuring 50×50×5 (mm), a composition 3 was injected into the space measuring 1 mm in thickness, and the composition 3 was heated at 80° C. for 2 hours to cure to prepare a test specimen 4.

The acrylic resin plates 1 and 2 of the test specimen were pulled in a direction normal to the bonded surfaces by using a tensile machine with an autograph (manufactured by Shimadzu Seisakusho Ltd.) at a speed of 50 mm/min to measure the adhesion. The results are shown in Table 2.

TABLE 2

| | Example 1 | Example 2 | Example 3 | Example 4 | Example 5 | Comparative Example 1 |
|---|---|---|---|---|---|---|
| Penetration | 40 | 42 | 65 | 75 | 73 | 70 |
| Adhesion (gf/cm$^2$) | 930 | 1,000 | 820 | 640 | 500 | 40 |

We claim:
1. An organopolysiloxane composition, comprising
(A) an organopolysiloxane having 0.1 to 2 alkenyl groups bonded to silicon atoms on average in the molecule,
(B) an organohydrogenpolysiloxane having two or more hydrogen atoms bonded to silicon atoms in the molecule, and
(C) an addition reaction catalyst, wherein each of said organopolysiloxane (A) and said organohydrogenpolysiloxane (B) has at least two alkoxy groups having 4 or less carbon atoms or at least one epoxy group in the molecule, and said organohydrogenpolysiloxane (B) is blended in such an amount that the number of the hydrogen atoms bonded to the silicon atoms of the organohydrdogen polysiloxane (B) is 0.5 to 2 per alkenyl group bonded to the silicon atoms of the organopolysiloxane (A).

2. An organopolysiloxane composition as claimed in claim 1, wherein each of said organopolysiloxane (A) and said organohydrogenpolysiloxane (B) has at least two alkoxy groups and at least one epoxy group in the molecule.

3. An organopolysiloxane composition as claimed in claim 1, wherein said epoxy group is represented by the following general formula:

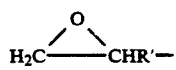

wherein R′ represents a bivalent organic group selected from the group consisting of an alkylene group, a phenylene group, a halogenated alkylene group, a hydroxyl group containing hydrocarbon group, and an ether linkage containing hydrocarbon group.

4. An organopolysiloxane composition as claimed in claim 1, wherein said epoxy group is a β-(3,4-epoxycyclohexyl) ethyl group or a γ-(3,4-epoxycyclohexyl)ethyl group.

5. An organopolysiloxane composition as claimed in claim 1, wherein said organopolysiloxane (A) is represented by the following average formula:

$$R_a^1 R_b^2 R_c^3 SiO_{\frac{4-(a+b+c)}{2}}$$

wherein a is a number with $0<a<3$, b is a number with $0 \leq b<3$, and c is a number with $0 \leq c<3$, provided that $0<a+b+c<4$, $R^1$ represents an alkenyl group, $R^2$ represents a substituted or unsubstituted hydrocarbon group containing no aliphatic unsaturated groups, and $R^3$ represents an alkoxy group or an epoxy group.

6. An organopolysiloxane composition as claimed in claim 1, wherein said organohydrogenpolysiloxane (B) is represented by the following average formula:

$$R_d^4 H_e R_f^5 SiO_{\frac{4-(d+e+f)}{2}}$$

wherein d is a number with $0 \leq d<3$, e is a number with $0<e<2$, and f is a number with $0 \leq f<3$, provided that $0<d+e+f<4$, $R^4$ represents a substituted or unsubstituted monovalent hydrocarbon group containing no aliphatic unsaturated groups, and $R^5$ represents an alkoxy group or an epoxy group.

7. A gel cured product obtained by curing an organopolysiloxane composition as claimed in claim 1.

* * * * *